United States Patent [19]
Cliber

[11] Patent Number: 5,344,261
[45] Date of Patent: Sep. 6, 1994

[54] LENS GENERATOR AND TOOL CUTTER

[76] Inventor: Richard M. Cliber, G-7200 W. Potter Rd., Flushing, Mich. 48433

[21] Appl. No.: 69,438

[22] Filed: Jun. 1, 1993

[51] Int. Cl.$^5$ .................................................. B23C 3/00
[52] U.S. Cl. ................................... 409/132; 409/197; 409/199; 409/217
[58] Field of Search ............... 409/130, 131, 132, 158, 409/162, 165, 166, 168, 197, 199, 200, 203, 206, 217; 29/30, 33 R; 51/58, 64, 65, 100 R, 101 R, 101 LG, 325

[56] References Cited

U.S. PATENT DOCUMENTS

| | | | |
|---|---|---|---|
| 3,910,159 | 10/1975 | Gladwin | 409/199 |
| 4,061,077 | 12/1977 | Gladwin | 409/199 |
| 4,264,249 | 4/1981 | Dawson | 409/199 |
| 5,217,335 | 6/1993 | Houchens, Jr. et al. | 409/134 |

*Primary Examiner*—Daniel W. Howell
*Attorney, Agent, or Firm*—Harness, Dickey & Pierce

[57] ABSTRACT

The lens generator which produces a curved surface in a lens blank while simultaneously producing a complementary curved surface in a lap or tool used to fine and polish the lens. By producing a tool having the exact shape as the lens, it is possible to manufacture the lens precisely to the requirements of a customer's prescription. By simultaneously cutting the lens and the lap, the production time is decreased as compared to generators that first produce a lens and subsequently produce a lap. A mechanical arrangement is used resulting in a simple and inexpensive machine.

25 Claims, 3 Drawing Sheets

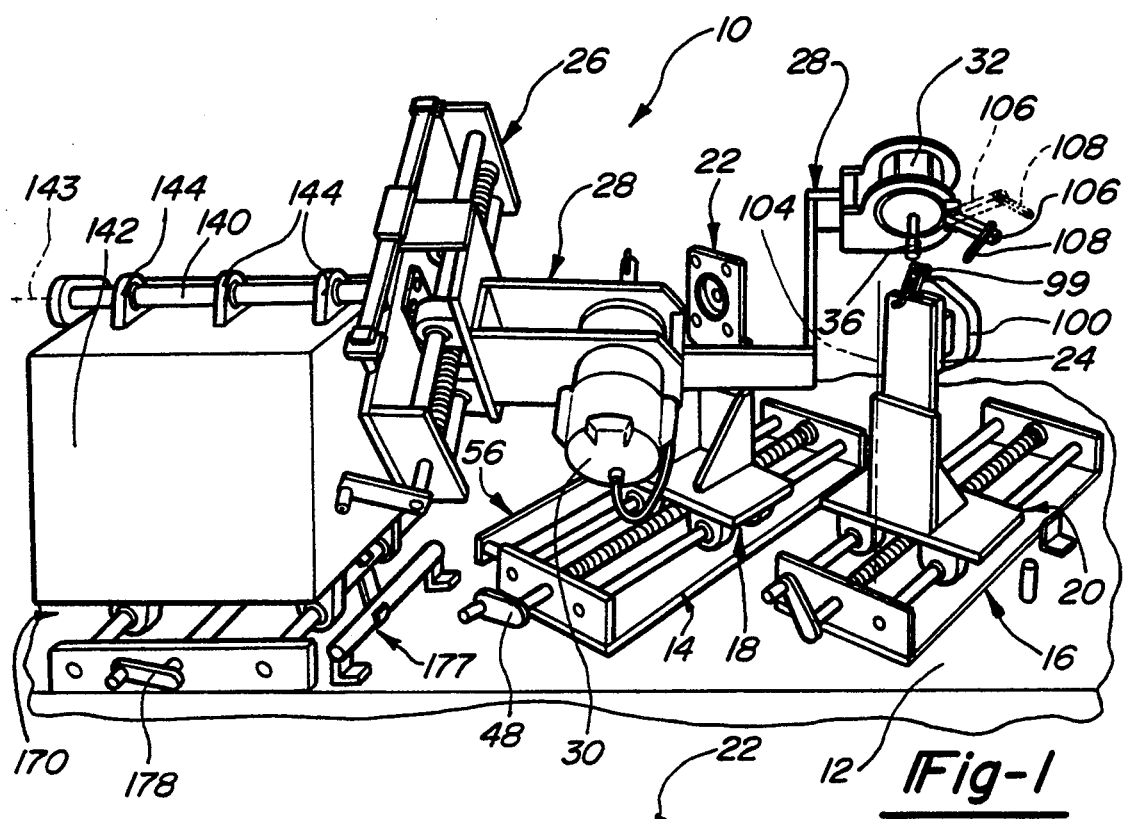
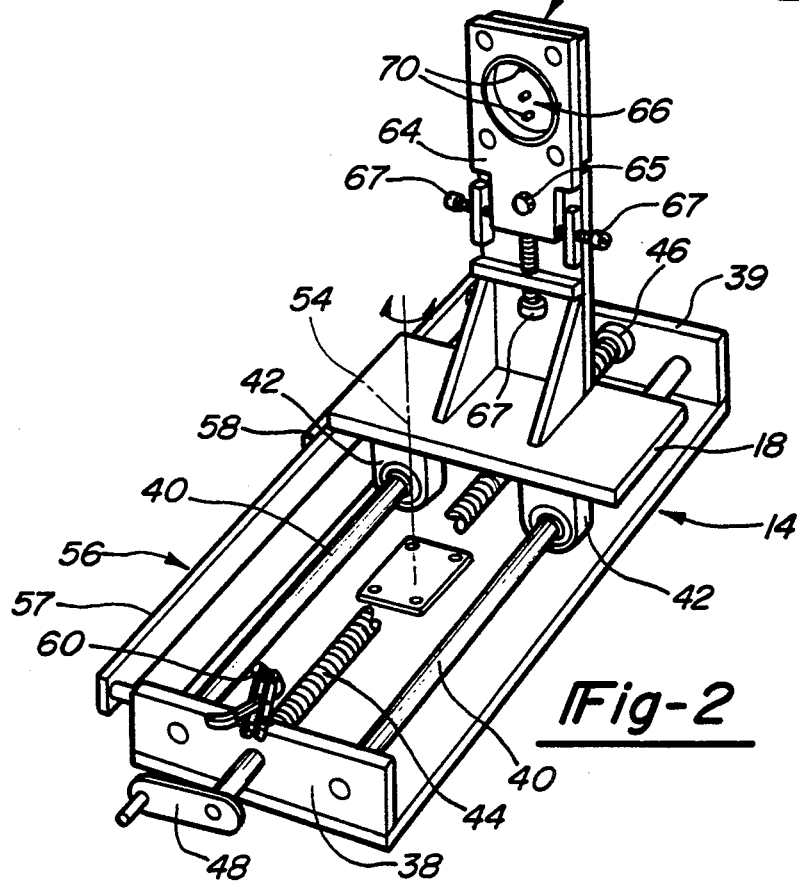

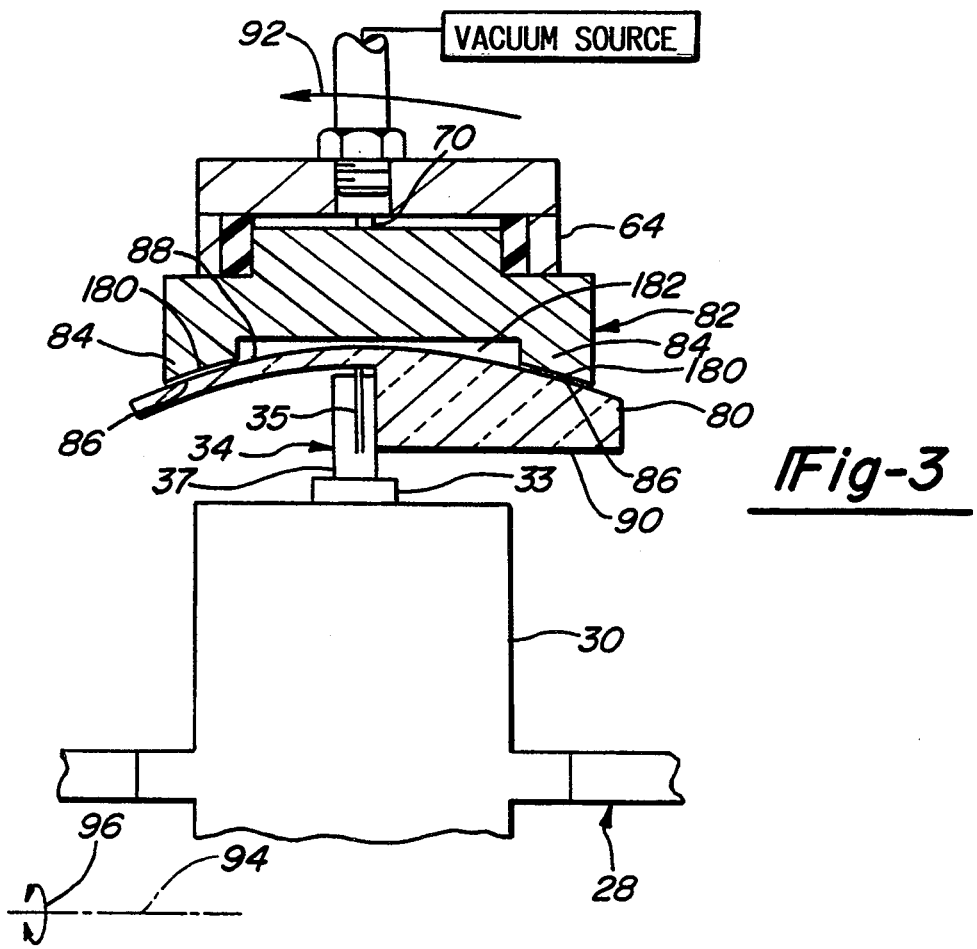
_Fig-3_
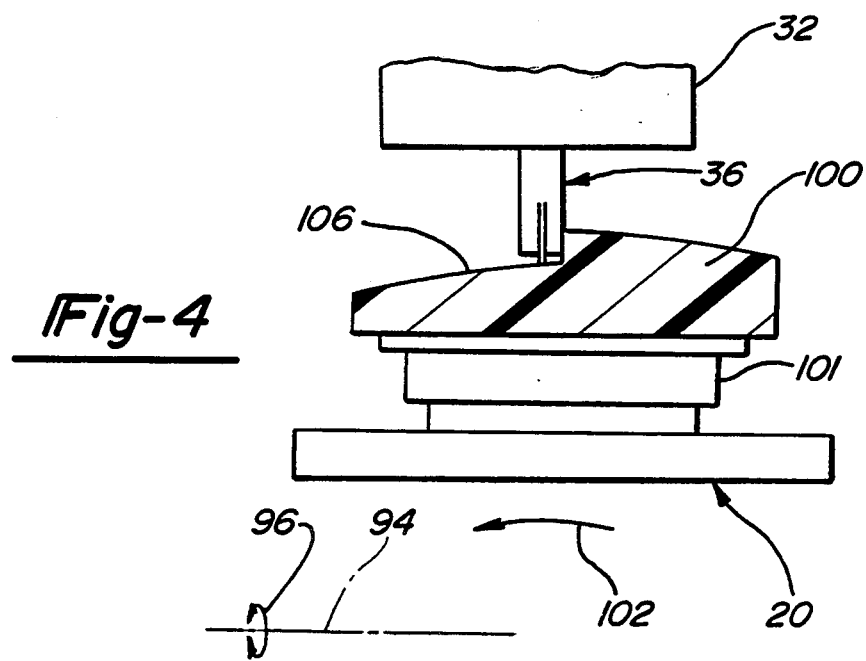
_Fig-4_

LENS GENERATOR AND TOOL CUTTER

BACKGROUND AND SUMMARY OF THE INVENTION

The present invention relates to a device for cutting plastic lenses for eyeglasses and in particular to a machine for cutting a curved lens surface and simultaneously cutting a complementary lap used to fine and polish the lens surface.

Plastic eyeglass lenses are typically produced from a molded semi-finished lens blank supplied to opticians. The semi-finished blanks are provided with the front surface of the lens already finished. Blanks are available with a variety of front surface curves known as the lens base curve. The optician is responsible for cutting or machining the inside, or concave curve, on the blank to produce a lens to the prescription of the customer.

The proper radius of the inside curve is a function of the lens base curve, the refractive index of the lens material and the customer's prescription. For a given prescription, a lens blank of a preferred base curve is selected and the inside radius is calculated based on the above known variables. The inside lens surface is cut into the blank using a machine known as a generator.

Once the concave surface is cut into the lens blank, the cut surface is fined and polished on a cylinder machine. This is typically performed by placing the concave lens surface onto a convex lap or tool of the same curvature. With a fining or polishing material located therebetween, the lens and the lap are moved relative to one another in an orbital or similar motion to fine or polish the lens surface. Once the concave surface has been polished, the lens is cut to fit the desired frame, the edge is finished, the lens is tinted and any surface coatings are applied.

Due to the expense of equipment required to cut the lens surface and finish the lens, many opticians must send their customer's orders to a central lab for production of the lenses. This necessitates a two to four day minimum wait before the customer receives his or her eyeglasses. Many larger optical outlets have a sufficient volume to justify the expense of a generator, enabling much quicker service to be provided.

In a typical on-site lab, the optician will have a supply of laps ready made to a variety of different curvatures to fine and polish the lenses. However, the laps are provided with a certain increment in radius between each lap. In order to fine and polish a lens on one of the available laps, it may be necessary to slightly alter the lens inside curvature from that calculated based on the prescription. If the increments between laps are small enough, the change is insignificant and not noticeable by the customer. To provide a sufficient supply of ready made laps to meet most of customer demands, a large quantity of laps must be purchased and stored when not in use. This can add significantly to the total cost of the laboratory equipment needed by the optician in order to provide quick service.

To remedy the inventory problem with laps, recent advances in the lens cutting art have resulted in machines that are capable of cutting a lens and subsequently cutting a lap to the same curvature. However, the currently available machines are complex and therefore available only at a high cost. The high cost makes the machines only practical for high volume labs. These machines will first cut the lens surface and then, using the same tooling, cut a complementary shaped lap. Such a machine, while overcoming the disadvantage of using stocked laps, requires two sequentially cutting operations. In addition, the generator requires complex controls and cutting mechanisms to form both a concave and convex surface.

Accordingly, it is an object of the present invention to provide an inexpensive lens generator that is capable of producing both a lens and a complementary lap.

It is a further object of the invention to provide a generator that will simultaneously cut both the lens and the lap to reduce the manufacturing process time for the lenses.

The present invention consists of a rotary cutter, such as a router, mounted to a fixture for oscillating motion of a cutting tool within a plane. The cutter is mounted to a fixture that oscillates about a rotation axis with the cutting tool extending radially outward. As a result, the cutting tool will cut a concave surface. The cutter is adjustable radially relative to the rotation axis so as to enable adjustment of the radius cut by the tool.

The lens blank is held in a fixture that is movable in an arc in a second plane transverse to the plane of oscillation of the cutter. The position of the lens blank is adjustable radially relative to the axis of rotation of the cutter to produce a finished lens having a desired thickness. With the lens blank moving in an arc in one plane and with the cutter oscillating in an arc in a transverse plane, a spherical surface is cut in the lens blank. Further adjustment capability is provided to move the axis of the cutter relative to the rotation axis of the lens to enable the production of a compound lens having a vertical radius different from the horizontal radius.

In the preferred embodiment, the cutter oscillates in a vertical direction and plane while the lens blank travels in an arc in a horizontal plane.

A second cutter is mounted to the oscillating fixture holding the lens cutter but oriented so that its cutting tool extends radially inward toward the oscillation axis. As a result, a convex curve is cut as opposed to the concave curve of the lens cutter. Another mounting fixture is provided to mount a lap oriented in the opposite direction relative to the lens blank. The lap mounting fixture is movable together with the lens blank mounting fixture. As the lap cutter oscillates in one plane and the lap travels in a transverse plane, a convex surface is cut into the lap of the same radius as the concave surface cut in the lens blank. The lap is then used to fine and polish the lens. By custom manufacturing of the lap to fit a particular lens, the lens and lap are made to the exact radius needed for the prescription. There is no need to adjust the lens radius to fit the available laps used to fine and polish the lens.

The lens generator of the present invention is a relatively simple mechanical device that enables the machine to be manufactured and sold at a significantly lower cost than currently available generators that produce both a lens and lap. As a result, an optician with a relatively low volume is able to justify the cost of a generator, thereby enabling him or her to provide on-site service in a short period of time.

Further objects, features and advantages of the invention will become apparent from a consideration of the following description and the appended claims when taken in connection with the accompanying drawings.

BRIEF DESCRIPTION OF THE DRAWINGS

FIG. 1 is a perspective view of the lens generator of the present invention;

FIG. 2 is a perspective view of the lens mounting fixture and the translation stage for adjusting the radius of the lens path of travel;

FIG. 3 is a partial plan view and a partial sectional view showing a lens blank being cut;

FIG. 4 is a partial plan view and partial sectional view showing a lap being cut;

DETAILED DESCRIPTION OF THE INVENTION

Figure 5:
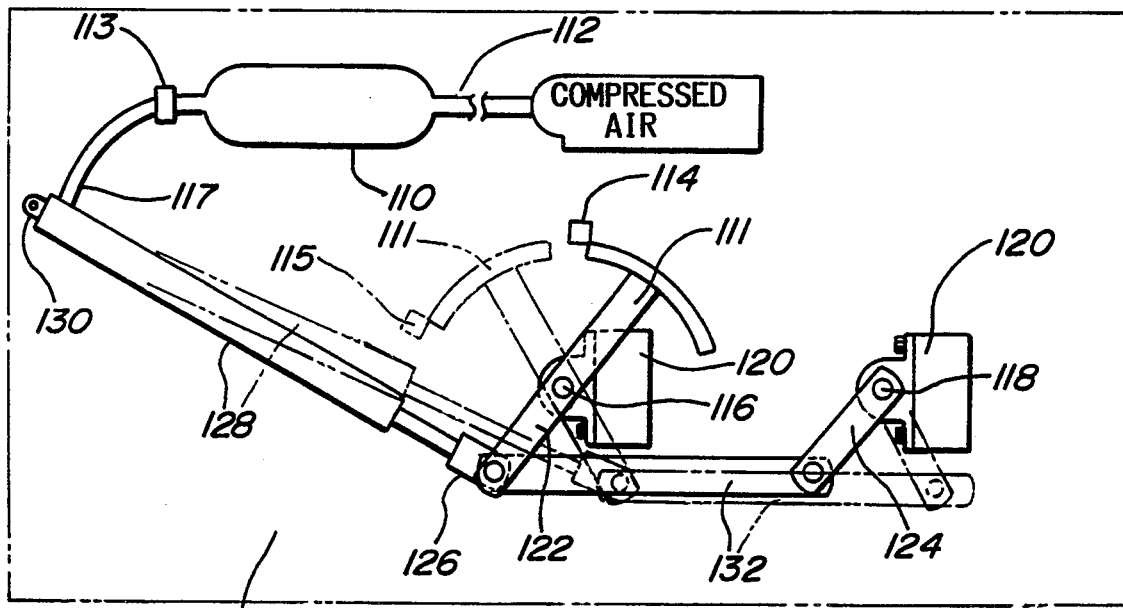
FIG. 5 is a plan view showing the drive mechanism for the lens blank and lap translation stages.

The lens generator of the present invention is shown in FIG. 1 and designated generally at 10. Generator 10 is capable of cutting the unfinished surface of a lens blank while simultaneously cutting a complementary shaped lap or tool. The tool is subsequently used to polish the rough cut surface of the lens blank forming a finished lens surface. The generator 10 includes a platform 12 upon which is supported a lens translation stage 14 and a tool translation stage 16. The lens and tool translation stage each support a fixture 18 and 20 respectively. The lens translation stage fixture 18 supports a lens holder 22 shown in FIG. 3 while the tool translation stage 20 supports a tool holder 24 shown in FIG. 4. The lens translation stage 14 and the tool translation stage 16 are mounted upon the platform 12 for rotation about separate vertical axes as described below.

A cutter translation stage 26 is mounted to the generator drive housing 142 for rotation about a horizontal axis also described below. The cutter translation stage 26 supports a cutter fixture 28. The cutter fixture 28 in turn supports a lens cutter 30 and a tool cutter 32. The lens and tool cutters are electric motors each with a chuck 33 attached to their output shafts. A cutting bit 34 is mounted to the lens cutter while a cutting bit 36 is mounted to the tool cutter. Bit 34 has a pair of diametrically spaced cutting knives 35 and a shaft 37. The bit 34 is rotated about the axis of the shaft 37. The lens cutter is a 9 amp motor rotating at 25,000 rpm while the tool cutter is a 1/15 hp motor operating at 5,000 rpm.

The lens blanks are made of polycarbonate, CR39 or other high index plastic material used in ophthalmic lenses. The lap or tool is made of a rigid expanded polystyrene and is available from Gerber Optical. Because the tool is made of a softer material, the motor used for the tool cutter need not be as large as the lens cutter motor. Due to the smaller size of the tool cutter motor, it is preferable to locate the tool cutter the farthest from the cutter translation stage.

With reference to FIG. 2, the lens translation stage 14 is shown in detail. Translation stage 14 includes a pair of guide rods 40 extending the length of the translation stage. The fixture 18 is mounted by two bearing assemblies 42 on each of the guide rods 40. The guide rods and bearing assemblies limit motion of the fixture 18 to pure translation.

An Acme threaded drive screw 44 extends the length of the translation stage parallel to the guide rods 40. Bearings 46 (only one of which is shown) mount the drive screw to the end walls 38 and 39 of the translation stage. The shaft of the drive screw 44 extends beyond the front end wall 38 and is coupled to a hand crank 48 used to rotate the drive screw 44. The fixture 18 is coupled to the drive screw by a stationary collar (not shown) having an internally threaded bore engaging the threads of the drive screw. Upon rotation of the drive screw 44 by the hand crank 48, the fixture 18 is caused to translate along the two guide rods 40.

The translation stage 14 is mounted to the platform 12 (shown in FIG. 1) of the generator for rotation of the translation stage about the vertical axis 54 (shown in FIG. 2). An electronic linear scale 56 is mounted to the lens translation stage 14 to precisely adjust the position of the lens fixture. The scale 56 includes a rule 57 mounted to the end walls 38 and 39 and a monitor 58 mounted to the lens fixture 18. A read out (not shown) displays the position of the fixture. The scale 56 is used to adjust the position of the lens blank so that the cut concave surface is located relative to the finished convex surface of the lens blank to produce a lens of the desired thickness. A manually operated brake 60 is provided at the front end wall 38 to lock the drive screw 44 in place once the fixture has been positioned as desired. The brake only needs to counter vibration forces. There are no cutting forces acting to rotate the drive screw.

The translation stage 16 for the tool is similar in its construction to the translation stage 14 for the lens. Translation stage 16 likewise rotates about a vertical axis and, as will be described below, the lens translation stage 14 and the tool translation stage 16 are coupled together for simultaneous rotational movement about their respective vertical axes.

The cutter translation stage 26 is constructed in a manner similar to the lens and tool translation stages. The cutter translation stage includes a linear scale 62 for measuring the position of the cutters. The location of the lens cutting bit 34 relative to the cutter pivot shaft 140 determines the radius of curvature cut vertically in the lens blank. The position of the lens cutting bit 34 relative to the lens translation stage axis of rotation determines the radius of curvature cut horizontally in the lens blank. With both of these distances set the same, a spherical concave surface is cut in the lens blank. The linear position of the lens blank in the fixture 18 as measured by the scale 56 determines the thickness of the cut lens.

The lens fixture 18 includes a lens mounting plate 64 with a vacuum chuck 66 for mounting a lens block 82 thereto as shown in FIG. 3. The vacuum chuck 66 includes a pair of locating pins 70 for accurately locating the lens block 82 in the chuck 66. The lens mounting plate 64 is attached to the lens fixture 18 base plate by bolt 65. The hole through the mounting plate 64 for the bolt is slightly oversized to permit adjustment of the mounting plate. Adjusting screws 67 precisely locate the mounting plate 64.

A lens blank 80 is shown in FIG. 3 being cut by the lens cutter 30. The lens blank 80 is attached to a mounting block 82 which is in turn mounted to the lens fixture 18 by the vacuum chuck 66. Mounting block 82 has a raised annular ring 84 with a curved outer surface 86. The lens blank 80 is manufactured with a finished front surface 88 already shaped to a base curve. The curved outer face 86 is matched to the base curve of the mounting block 82. A lens for a particular prescription is formed by cutting, fining and polishing the rear surface 90 of the lens blank to create a curved surface 98.

The cutting of the rear surface 90 is accomplished by rotation of the lens blank 80 about the vertical axis 54 as shown by the arrow 92 in FIG. 3. While the lens blank 80 makes one pass along its curved path horizontally, the lens cutter 30 and bit 34 oscillate up and down by rotation about the lens cutter axis 94 shown by the arrow 96. The speed at which the lens blank 80 travels horizontally is related to the rate of oscillation of the lens cutter such that during one half cycle of the lens cutter oscillation, the lens will move horizontally no more than the diameter of the lens cutting bit 34. The lens cutter bit 34 extends from the lens cutter 30 in a direction radially outward relative to the axis 94. This orientation produces a concave surface 98 in the lens blank 80.

The rough cut lens surface 98 is then fined and polished in a process with a tool or lap. The lap must have a complementary curved surface to that of the lens in order to properly fine and polish the lens surface without changing the curvature. The lens generator 10, while cutting the lens surface 98, simultaneously cuts a tool 100 having a complementary convex surface. By cutting a tool to the same curvature as the lens surface, there is no need to adjust the curvature of the lens surface to fit an available tool from an inventory of such tools. The resulting lenses are therefore more precisely made to the prescription.

With reference to FIG. 4, a tool blank 100 is shown mounted to the tool fixture 20. The tool 100 moves in a curved path as shown by the arrow 102 as the tool translation stage 16 rotates about its vertical axis of rotation. Simultaneous with the tool moving in a curved horizontal path, the tool cutter 32 is oscillating about the axis 94 as shown by arrow 96. Again, the tool 100 makes one pass along its curved horizontal path while the tool cutter 32 makes several oscillating cycles in a vertical path. The tool cutter is oriented opposite the lens cutter so that the bit 36 of the tool cutter extends radially inwardly, toward the axis 94. As a result, the path travelled by the bit 36 will cut a convex surface into the tool blank 100. The tool cutter is mounted in the cutter fixture 28 so that the tool cutting bit and the lens cutting bit are located at the same radial position relative to the axis 54. As a result, the curved surface 106 cut into the tool will be of the same radius as the concave surface 98 cut into the lens blank.

The tool fixture includes a clamp 99 used to mount a tool holder 101. A tool 100 is mounted to the holder 101 for shaping. No scale is provided on the tool translation stage because the thickness of the tool after cutting is not a critical dimension. Only the curvature is important and that is determined by the location of the cutter bit 36.

An arm 106 extends from the cutter fixture with a positioning finger 108 projecting therefrom as shown in FIG. 1. The tool translation stage is positioned so that the tool surface contacts the positioning finger. The arm 106 is rotatably mounted to the cutter fixture for movement away from the tool after the tool has been set in place. By engaging the finger 108 with the tool surface it is ensured that the tool is close enough to the tool cutter to have its surface cut.

With reference to FIG. 5, the drive mechanism for rotating the lens and tool translation stages 14 and 16 is shown. A pair of vertical pivot shafts 116 and 118 are mounted beneath the platform 12 of the lens generator for the lens and tool translation stages respectively. The pivot shafts are each mounted by a pair of bearing blocks 120 (only one of each pair is shown). The pivot shafts 116 and 118 are coupled to the translation stages whereby the translation stages will rotate upon rotation of the pivot shafts.

Extending from pivot shafts 116 and 118 are crank arms 122 and 124 respectively. Crank arm 122 for the lens cutter pivot shaft is coupled to one end 126 of a hydraulic cylinder 128. The opposite end 130 of the cylinder is rotatably coupled to the platform 12. Upon extension of the cylinder 128, the crank arm 122 causes the pivot shaft 118 to rotate, thereby rotating the lens translation stage. A link 132 connects the two crank arms 122 and 124 so that the crank arm 124 and the pivot shaft 118 are rotated simultaneously with the pivot shaft 116. This causes the tool translation stage to rotate simultaneously with the lens translation stage.

The cylinder 128 is a one-way acting cylinder with an internal biasing means for returning the lens and tool translation stages to their initial positions after the hydraulic pressure has been relieved. The cylinder 128 is driven by oil from an accumulator 110. Compressed air is supplied to the accumulator 110 by conduit 112 to force oil out of the accumulator, through conduit 117 to the cylinder. The compressed air can be supplied either by a compressor included as a part of the generator 10 or from an external source of compressed air. A metering orifice 113 ensures a constant flow of oil from the accumulator into the cylinder 128 over a wide range of pressure of the compressed air and over the varying amounts of resistance met by the cylinder during the cutting operation. This ensures that the speed of travel of the lens and tool translation stages will be uniform and predictable.

A control arm 111 extends from the pivot shaft 116 to control the operation of the generator by engagement with switches 114 and 115. With the lens and tool translation stages in their initial position shown in FIG. 1, the control arm 111 is spaced slightly from the switch 114. Upon initiation of an operating cycle, the cylinder 128 is operated to begin rotation of the lens and tool translation stages. When the control arm 111 engages switch 114, the switch is closed and the two cutters begin operating. As long as the control arm 111 remains in contact with the switch 114, the cutters continue to operate. After control arm 111 passes the switch 114, the two cutters stop. Continued rotation of the lens and tool translation stages ultimately results in the control arm 111 engaging switch 115 which, when closed, terminates the supply of compressed air to the accumulator 110 and vents the air in the accumulator to atmosphere. This enables the bias means of cylinder 128 to return the lens and tool translation stages to their beginning positions. Switch 114 is designed so that it will only close upon contact with the control arm 111 travelling in one direction, whereby upon return of the control arm, the switch 114 remains open.

Figure 6:
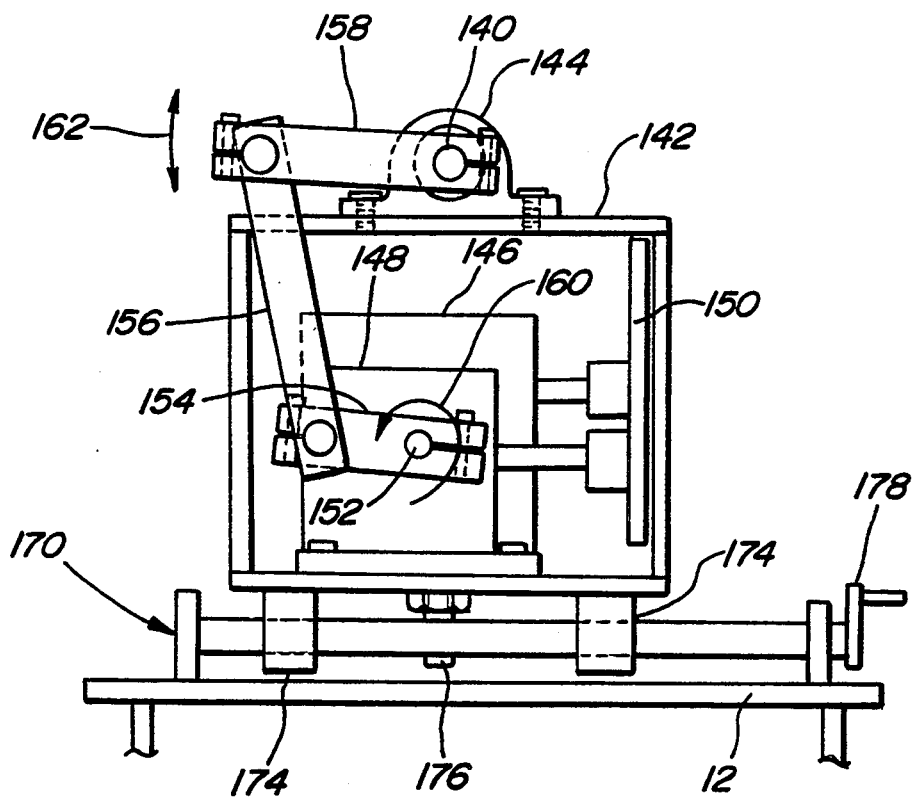
FIG. 6 is an end view showing the drive mechanism for the lens and lap cutters and the translation stage for adjusting the position of the cutter cutting tools.

Referring back to FIG. 1, the cutter translation stage 26 is mounted to a pivot shaft 140. Pivot shaft 140 is carried by oscillation drive housing 142 and is mounted thereto by a plurality of bearing assemblies 144. The pivot shaft 140 defines the oscillation axis of the lens and tool cutters. The drive housing 142, as shown in FIG. 6, contains an electric motor 146 driving a worm gear reduction unit 148 by a belt 150. The output shaft 152 of the gear reduction unit is coupled to a crank arm 154. The crank arm 154 is coupled through a link 156 to a second crank arm 158 coupled to the pivot shaft 140. Upon rotation of the crank arm 154, shown by the arrow 160, the crank arm 158 oscillates as shown by the arrow 162 to oscillate the cutters 30 and 32.

The drive housing 142 is mounted upon the platform 12 by an oscillation drive housing translation stage 170. The translation stage 170, like the other translation stages, has a pair of guide rods 172 each of which pass through a pair of linear bearings 174. A collar 176 having an internally threaded bore is coupled to a threaded drive screw rotated by the hand crank 178 at the front of the generator 10.

The purpose of the drive housing translation stage is to enable a compound lens to be manufactured in which the vertical radius of curvature is different from the horizontal radius of curvature. Such a lens is necessary to correct astigmatism. To produce such a lens, the lens cutter and the lens fixture are set to rotate at two different radii. However, with two different radii set, it is then necessary to adjust the location of the pivot shaft 140 so that the tip of the lens cutter bit will be located appropriately with respect to the lens blank to produce a lens of the desired thickness. A linear scale 177 is attached to the translation stage to measure the position of the oscillation drive housing.

Again with reference to FIG. 3, it will be noted that the lens block 82 is of a conventional structure for a lens block used to mount lens blanks in currently used generators The lens blank is mounted to the holder by the use of a double sided adhesive tape 180 applied to the surface 86 of the raised annular ring 84. The hollow space 182 between the lens blank and the block 82 remains unoccupied. This is in contrast to the current method of mounting a lens blank in which a film is applied to the front surface 88 of the lens blank and onto that film is cast a low melting point alloy, filling the void 182 and securing the lens blank to the block. The cutting operation with the rotating bit 34 is performed with significantly less force being applied to the lens blank than in the prior art generators using grinding wheels, etc., to cut the lens. As a result, less strength is needed in mounting the lens blank. Accordingly, the prior art method of using a metal alloy to mount the lens is no longer required.

The generator of the present invention produces a curved surface in a lens blank while simultaneously producing a complementary curved surface in a lap or tool used to fine and polish the lens. By producing a tool having the exact shape as the lens, it is possible to manufacture the lens precisely to the requirements of the customer's prescription. Furthermore, by simultaneously cutting the lens and the lap, the production time is decreased as compared to generators that first produce a lens and subsequently produce a lap. The generator of the present invention accomplishes the simultaneous lens and lap production with a mechanical arrangement resulting in a simple and inexpensive machine.

The generator 10, by using a cutting bit instead of a grinding wheel, can not be used to cut glass lenses but only plastic lenses. However, since roughly 80% to 90% of the ophthalmic lenses are made of a plastic material rather than glass, the optician will be able to provide quick service to most customers.

While the invention has been shown and described as cutting a concave lens surface and a convex lap surface, the generator can be configured to enable convex lens surfaces and concave lap surfaces to be cut.

It is to be understood that the invention is not limited to the exact construction illustrated and described above, but that various changes and modifications may be made without departing from the spirit and scope of the invention as defined in the following claims.

I claim:

1. In a lens generator for forming a curved surface in a lens blank having an unfinished surface to produce an ophthalmic lens, first mounting means for mounting a lens blank, first cutting means for cutting into the lens blank unfinished surface to form said curved surface, second mounting means for mounting an unshaped tool and second cutting means for simultaneously cutting a curved surface in said tool complementary to the curved surface cut in the lens blank whereby said tool can be used to fine and polish the curved surface cut in the lens blank.

2. The lens generator of claim 1 wherein:
said first cutting means includes a lens cutter having a distal end and said second cutting means includes a tool cutter having a distal end;
said generator further comprising means for oscillating said lens cutter and said tool cutter about an oscillation axis whereby the distal ends of said lens cutter and said tool cutter move in circular paths within first and second planes of oscillation respectively;
first moving means for moving the lens blank along a circular path transverse to said first plane of oscillation, past said distal end of said lens cutter whereby said lens blank is cut by said cutter; and
second moving means for moving the tool along a circular path transverse to the second plane of oscillation, past said distal end of said tool cutter whereby said tool is cut by said cutter.

3. The lens generator of claim 2 further comprising adjustment means for adjusting the radial distance of the distal ends of said lens and tool cutters from said oscillation axis whereby the radius of curvature of the circular paths of the distal ends of said lens and tool cutters can be varied.

4. The lens generator of claim 2 further comprising a single drive means for driving both said first and second moving means to move said lens blank and said tool simultaneously.

5. The lens generator of claim 2 wherein said lens cutter and said tool cutter oscillate in two spaced vertical planes and the circular paths of said lens blank and said tool are within a common horizontal plane.

6. The lens generator of claim 2 further comprising:
first adjustment means for adjusting the radial distance of the distal ends of said lens and tool cutters from said oscillation axis whereby the radius of curvature of the surface cut into said lens blank along said first plane of oscillation can be varied; and
second adjustment means for adjusting the distance between the distal ends of said lens and tool cutters and the centers of curvature of the paths of the lens blank and the tool whereby the radius of curvature of the surface cut into said lens blank transverse to said first plane of oscillation can be varied independently of said first adjustment means to form a compound curved surface in the lens blank and the tool.

7. The lens generator of claim 2 wherein said lens and tool cutters are cutting bits each having a rotational axis and at least one knife edge for cutting said lens blank and said tool respectively, the lens cutting bit rotational axis lying in said first plane of oscillation and said tool cutting bit rotational axis lying in said second plane of oscillation.

8. In a lens generator for forming a curved surface in a lens blank having an unfinished surface to produce an ophthalmic lens, first mounting means for mounting a lens blank with said unfinished surface exposed, first cutting means for cutting into the unfinished surface of the lens blank to form said curved surface, said first cutting means including a lens cutting bit rotating about a first bit rotating axis, said lens cutting bit having at least one knife edge and a distal end, oscillating means for oscillating said first bit about an oscillation axis normal to said first bit rotating axis whereby the distal end of said lens cutting bit moves in a circular path within a plane of oscillation containing said first bit rotating axis, means for moving the lens blank along a circular path in a plane transverse to said plane of oscillation, past said distal end of said lens cutting bit whereby said lens blank is cut by said cutting means, first adjustment means for adjusting the radial distance of the distal end of said lens cutting bit from said oscillation axis whereby the radius of curvature of the surface cut into said lens blank along said plane of oscillation can be varied, and second adjustment means for adjusting the distance between the distal end of said lens cutting bit and the center of curvature of the circular path of the lens blank whereby the radius of curvature of the surface cut into said lens blank transverse to said plane of oscillation can be varied independently of said first adjustment means to form a compound curved surface in the lens blank.

9. A lens generator for cutting a rough lens surface in a lens blank and simultaneously cutting a tool complementary to said rough lens surface for use in polishing said rough lens surface, said lens blank having a body with a first finished lens surface and a second unfinished surface and having an optical axis, said generator comprising:

lens holder means for holding the lens blank with said unfinished surface exposed;

lens moving means for moving said lens holder means and the lens blank in a planar circular path with the optical axis of the lens blank extending radially of said circular path;

lens cutting means for cutting into the body of the lens blank to form said rough lens surface opposite said finished surface, said lens cutting means including a lens cutting motor and a lens cutting bit rotated by said lens cutting motor about a first bit axis of rotation, said lens cutting bit having a distal end projecting from said lens cutting motor;

tool holder means for holding a tool having an unfinished surface with said unfinished surface exposed;

tool moving means for moving said tool holder means and the tool in a planar circular path within the plane of the planar circular path of said lens blank;

tool cutting means for cutting into the body of the tool to form said tool surface complementary to said rough surface of said lens blank, said tool cutting means including a tool cutting motor and a tool cutting bit rotated by said tool cutting motor about a second bit axis of rotation, said tool cutting bit having a distal end projecting from said tool cutting motor;

mounting means for mounting said lens and tool cutting means; and oscillation means for oscillating said mounting means about an oscillation axis so that said distal end of said lens cutting bit oscillates along a circular path with the rotation axis of said lens cutting bit extending radially thereof, said rotating bit oscillating in a plane normal to the plane in which said lens blank optical axis travels as said lens blank is moved along its circular path, said lens holder means and said lens cutting means being relatively positioned so that the oscillating path of said lens cutting bit intersects the path of said lens blank whereby said lens cutting bit cuts into said lens blank body forming a curved lens surface;

said oscillating means further oscillating said mounting means about said oscillation axis so that said distal end of said tool cutting bit travels along a circular path with the tool bit rotation axis extending radially thereof, said rotating tool bit oscillating in a plane normal to the plane in which said tool travels as said tool is moved along its circular path, said tool holder means and said tool cutting means being relatively positioned so that the oscillating path of said tool cutting bit intersects the path of said tool whereby said tool bit cuts into said tool body forming a curved tool surface;

said mounting means mounting said lens and tool cutting motors and said bits so that one of said bits extends radially outwardly relative to said oscillation axis and the other of said bits extends radially inwardly relative to said oscillation axis whereby said tool cutting bit forms a curved surface in said tool complementary to the curved surface cut into said lens blank.

10. The lens generator of claim 9 wherein said lens cutting bit extends radially outwardly relative to said oscillation axis to cut a concave rough surface into said lens blank and said tool cutting bit extends radially inwardly relative to said oscillation axis to cut a convex surface into said tool.

11. The lens generator of claim 9 further comprising:

first adjustment means for adjusting the radial distance of the distal ends of said lens and tool cutting bits from said oscillation axis whereby the radius of curvature of the circular paths of the distal ends of said lens and tool cutting bits can be varied; and second adjustment means for adjusting the distance between the distal ends of said lens and tool cutting bits and the centers of curvature of the circular paths of the lens blank and the tool whereby said lens and tool surfaces can be cut with a compound curvature.

12. The lens generator of claim 9 wherein said lens and tool cutting bits are oscillated vertically and said lens blank and said tool are moved horizontally.

13. The lens generator of claim 9 further comprising common drive means for moving said lens and tool holder means whereby said lens blank and said tool are moved simultaneously.

14. The lens generator of claim 13 wherein said drive means includes a hydraulic system including an extensible hydraulic cylinder operatively coupled to said lens and tool holder means to rotate said lens and tool holder means upon extension and retraction of said cylinder, an oil accumulator in communication with said cylinder for storage of oil, a metering orifice for restricting oil flow between said accumulator and said cylinder and means for supplying compressed air to said accumulator to force oil from said accumulator to said cylinder to rotate said lens and tool holder means.

15. The lens generator of claim 13 further comprising control means coupled to said lens or tool holder means for starting and stopping the lens and tool cutting motors based on the position of said lens and tool holders.

16. The lens generator of claim 9 wherein said lens holder means includes a lens translation stage rotatable about a lens translation stage axis and a lens fixture with lens mounting means thereon, said lens fixture being linearly movable relative to said lens translation stage in a radial direction relative to said lens translation stage axis whereby the radius of said lens blank circular path is adjustable.

17. The lens generator of claim 16 wherein said tool holder means includes a tool translation stage rotatable about a tool translation stage axis and a tool fixture with tool mounting means thereon, said tool fixture being linearly movable relative to said tool translation stage in a radial direction relative to said tool translation stage axis whereby the radius of motion of said tool circular path is adjustable.

18. The lens generator of claim 16 further comprising scale means operatively associated with said lens fixture for measuring the radial position of said lens fixture on said lens translation stage.

19. The lens generator of claim 9 wherein said mounting means for said lens and tool cutting means includes a cutter translation stage rotatable about said oscillation axis and a cutter fixture mounted thereon, said cutter fixture mounting said lens and tool cutting motors, said cutter fixture being linearly movable relative to said cutter translation stage in a radial direction relative to said oscillation axis whereby the radii of the circular paths of said lens and tool cutting bits is adjustable.

20. The lens generator of claim 19 further comprising scale means operatively associated with said cutter translation stage for measuring the radial position of said cutter fixture on said cutter translation stage.

21. The lens generator of claim 19 wherein said oscillation means includes an oscillation drive shaft aligned with said oscillation axis and oscillation drive means coupled to said oscillation drive shaft for rotating said oscillation drive shaft in an oscillating manner and an oscillation means translation stage for moving said oscillation drive shaft and said oscillation axis to vary the distance between said oscillation axis and the centers of curvature of the circular paths of the lens blank and the tool.

22. The lens generator of claim 21 further comprising scale means operatively associated with said oscillation means translation stage for measuring the position of said oscillation axis relative to the center of curvature of the circular paths of the lens blank and the tool.

23. A method of cutting a concave curved surface into a lens blank having a finished convex surface and an unfinished surface and said lens blank having an optical axis, said concave surface to be cut into said unfinished surface of said lens blank, said method comprising:
mounting said lens blank in a fixture with said unfinished surface exposed;
moving said lens blank along a first circular arc with said optical axis extending radially of said first circular arc with said unfinished surface disposed radially inward of said finished surface;
rotating a cutting bit having an elongated shaft and at least one knife edge about the axis of said shaft;
oscillating said cutting bit back and forth in a second circular arc with said shaft axis extending radially of said second arc and with said shaft axis oscillating in a plane transverse to the plane of said optical axis as said lens blank moves along said first circular arc; and
positioning said lens blank and said cutting bit relative to one another so that said cutting bit intersects with said lens blank and cuts into said lens blank unfinished surface as said lens blank moves in said first arc and said bit moves in said second arc.

24. The method of cutting a concave curved surface into a lens blank of claim 23 wherein said optical axis moves in a horizontal plane and said bit shaft axis moves in a vertical plane.

25. The method of cutting a concave curved surface into a lens blank of claim 23 wherein said lens blank moves once along said first arc from a beginning position to an end position while said bit oscillates several times along said second arc.

* * * * *